United States Patent [19]

Hodonsky

[11] Patent Number: 4,679,779
[45] Date of Patent: Jul. 14, 1987

[54] HYDRAULIC MOUNT
[75] Inventor: Joseph W. Hodonsky, Fenton, Mich.
[73] Assignee: General Motors Corporation, Detroit, Mich.
[21] Appl. No.: 875,187
[22] Filed: Jun. 17, 1986
[51] Int. Cl.⁴ .............................................. F16F 9/22
[52] U.S. Cl. ................................. 267/140.1; 188/298
[58] Field of Search .............. 188/298, 322.15, 322.22; 248/562; 267/35, 64.11, 64.27, 122, 140.1, 151

[56] References Cited
FOREIGN PATENT DOCUMENTS 0030545 2/1983 Japan ................................ 267/140.1
0072740 4/1983 Japan ................................ 267/140.1

Primary Examiner—Duane A. Reger
Attorney, Agent, or Firm—R. L. Phillips

[57] ABSTRACT

A hydraulic mount having one variable size orifice member that connects a first chamber to a second chamber with an orifice that decreases in size with increasing pressure differential between the chambers above a prescribed pressure range when the pressure in the first chamber is greater, and another variable size orifice member that connects the second chamber to the first chamber with an orifice that decreases in size with increasing pressure differential between the chambers above the prescribed pressure range when the pressure in the second chamber is greater.

4 Claims, 10 Drawing Figures

HYDRAULIC MOUNT

TECHNICAL FIELD

This invention relates to hydraulic mounts and more particularly to hydraulic mounts having variable damping.

BACKGROUND OF THE INVENTION

In hydraulic mounts such as those being used to an expanding degree to support an internal combustion engine in a motor vehicle, an orifice normally connects an expansible chamber with another chamber that is substantially less expansible and is defined by an elastomeric body connecting the mount's two mounting brackets. In such mounts, the orifice is normally of a prescribed fixed size and where variable damping is desired (e.g. high damping at low frequency and large amplitudes and low damping at high frequency and small amplitudes), it has become common practice to add a so-called "decoupler" that effects a volume displacement in the chambers such that no fluid is displaced through the orifice in relation to prescribed frequency and amplitude levels.

SUMMARY OF THE INVENTION

The primary object of the present invention is to provide a new and improved hydraulic mount having an infinitely variable orifice whose size varies from a norm in response to the pressure differential between the chambers.

A further object is to provide a new and improved hydraulic mount that allows dynamic rate and damping characteristics to be optimized relative to frequency and amplitude of movement and that may used in either tension or compression depending on the application.

A still further object is to provide a new and improved hydraulic mount with an infinitely variable orifice that is well suited to supporting and positioning an exhaust system relative to a motor vehicle body and its environmental components and to reducing the transfer of noise and vibration from the exhaust system to the passenger compartment.

In the preferred embodiment of the present invention, the hydraulic mount comprises a pair of mounting brackets that extend into the interior of a shell from opposite directions. An elastomeric body joins the mounting brackets to the interior of the shell and thus together and defines a first chamber that expands and contracts to only a small degree with relative reciprocal movement of the mounting brackets. A second chamber is located within the first chamber and is connected to the mounting brackets so as to expand and contract with relative reciprocal movement thereof and in unison with but to a substantially greater degree than the first chamber. An elastomeric valve connects the first chamber to the second chamber with an orifice that decreases in size with increasing pressure differential between the chambers above a prescribed pressure range when the pressure in the first chamber is greater. And a second elastomeric valve connects the second chamber to the first chamber with an orifice that decreases in size with increasing pressure differential between the chambers above the prescribed range when the pressure in the second chamber is greater. Both chambers are filled with a liquid and the elastomeric valves have a nominal size opening (orifice) that remains constant below a relatively small differential pressure between the chambers to thus allow free flow therethrough. Alternatively, when the pressure differential exceeds a prescribed level determined by the configuration and material properties of the valves, the respective valves then close in response thereto to reduce the size of their orifice and thereby provide higher damping. The net result is that in both compression and tension in the mount, wherein the bracket members reciprocate relative to each other, the two valves operate together so as to effect high damping at low frequency and high amplitudes and relatively low damping at high frequency and low amplitudes thereby producing the desired effect found best suited to isolating vibrations such as that of an exhaust system from the passenger compartment of a motor vehicle as will be described in more detail later.

DESCRIPTION OF THE PREFERRED EMBODIMENT

These and other objects, advantages and features of the present invention will become more apparent from the following description and drawing in which.

Figure 1:
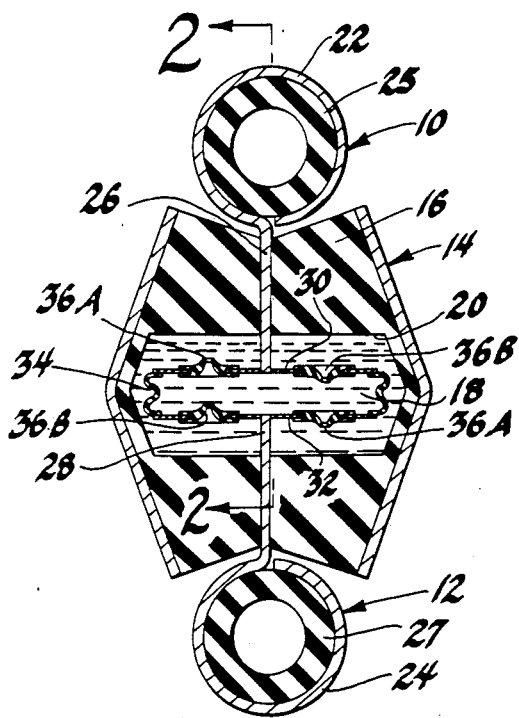
FIG. 1 is a sectional view of the preferred form of the hydraulic mount according to the present invention as adapted to mounting an exhaust system in a motor vehicle.
Figure 2:
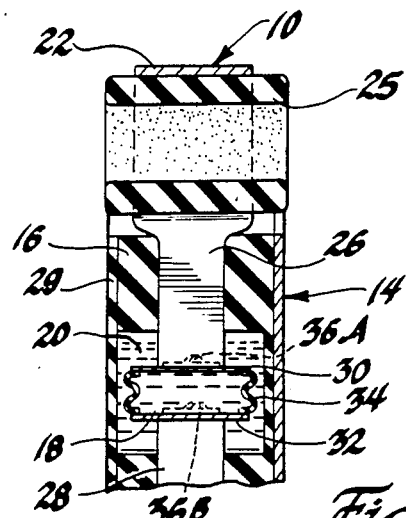
FIG. 2 is a view taken on the line 2—2 in FIG. 1.

Referring to the drawings wherein the same numbers are used to designate the same parts throughout the several views, there is shown in FIGS. 1 and 2 a hydraulic mount according to the present invention adapted for mounting an exhaust system in a motor vehicle. The mount comprises a pair of identical mounting straps 10 and 12, a shell 14, an elastomeric body 16 and an expansible chamber 18 filled with a liquid located within a chamber 20 of the elastomeric body 16 filled with the same liquid. The straps 10 and 12 each have a circularly formed end 22 and 24 receiving an elastomeric bushing 25 and 27 respectively by which the respective straps are connected by bolts to the underside of a motor vehicle body and an exhaust system respectively (the latter devices all being conventional and not shown).

The mounting straps 10 and 12 further have an elongated flat section 26 and 28 that extends downwardly and upwardly respectively into the interior of the shell 14. The shell 14 is three-sided and the elastomeric body 16 is molded in place to the interior of the three-sided shell 14 and to the opposite sides of the strap sections 26 and 28. In addition, the elastomeric body 16 is molded so as to define the outer chamber 20 which is closed by an elastomeric side wall 29 bonded to the one side of the body 16 as seen in FIG. 2. The inner chamber 18 is defined by a pair of rigid walls 30 and 32 welded to the inner end of the respective strap sections 26 and 28 and an elastomeric bellows 34 bonded to the periphery of these walls to sealingly join same while allowing relative movement therebetween to contract and expand the chamber 18 that these parts form. With such arrangement and upon compression in the mount wherein the mounting straps are forced toward each other and the elastomeric body 16 resists such relative movement in shear, the volume of the chamber 20 will decrease only slightly while the volume of the inner chamber 18 will decrease a relatively large degree. Alternatively, upon tension in the mount wherein the mounting straps are forced away from each other, the volume of the inner chamber will increase considerably more than the outer chamber.

Figure 3:
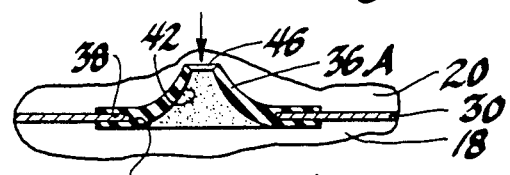
FIG. 3 is an enlarged view of one of the valves in FIG. 1 wherein the valve is shown normally open.
Figure 4:
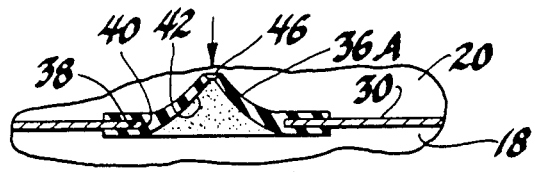
FIG. 4 is a view similar to FIG. 3 but showing the valve opening reduced in size.

A pair of variable orifice valves 36A and 36B that are of circular shape in plan view (not shown) are mounted in each of the walls 30 and 32 with these valves all being identical but being mounted in certain opposite flow directional manner as will now be described. As best seen in FIGS. 3 and 4, these valves which are formed of an elastomeric material such as rubber have a radially outwardly facing groove 38 in their periphery by which they are separately received over and extend about a hole 40 formed through the respective inner chamber wall so as to be sealingly secured thereto while providing a funnel shaped flow passage 42 between the inner and outer chambers 18 and 20. The valve 36A on the left side in the upper wall 30 in FIG. 1 is formed in its free state as shown in FIG. 3 with the cross section of the flow passage 42 converging outwardly from the inner chamber with a decreasing wall thickness to a large opening 46 that is designed to serve as an orifice for damping. Another valve 36A is similarly arranged and mounted in the lower wall 32 on the right side. On the other hand, a like valve 36B but arranged in opposite flow directional relationship is mounted in the upper wall 30 on the right side and in the lower wall 32 on the left side as seen in FIG. 1 with their cross section converging inwardly from the outer chamber and thus oppositely the valves 36A.

The valves 36A and 36B are designed through a combination of shape and material properties such as their modulus of elasticity so that their opening (orifice) 46 in their normal or relaxed condition has a prescribed large size as shown in FIG. 3 and remains substantially so below a certain differential pressure between the chambers with flow in the direction indicated by the arrows in FIGS. 3 and 4. However, upon the pressure differential exceeding this certain level, the resulting net force on these valves where it is acting inwardly thereon presses the outside diameter of the valve inward and reduces its orifice size as shown in FIG. 4.

By design, the pressure differential response of the valves 36A and 36B is selected so that the normal size of their orifice (FIG. 3) provides for a relatively free flow of liquid between the chambers but then at a prescribed pressure differential, their orifice then closes down or reduces in size (FIG. 4) to thereby substantially restrict the flow between the chambers and effect fluid damping. For example, in one particular motor vehicle where the exhaust system was found to have natural frequencies excited by the engine and transmitted to the exhaust system hangar locations of 50 and 95 Hz, it was desired that these frequencies be isolated from the vehicle body, but also with the requirement that the exhaust system be contained vertically within a prescribed 25 mm envelope during vehicle dynamic maneuvers in the 1 Hz range and exhaust system response to road inputs to the suspension in the 10 Hz range. Given these parameters, the subject mount was tailored so that the orifice size and shape of the valves 36A and 36B allowed free fluid flow between the chambers for low damping at the high frequencies and low amplitude vibrations of 50 and 95 Hz but then close down so that the mount acts as a relatively solid connection to restrict exhaust system movement with high damping at the lower frequencies and high amplitude vibrations of 1 and 10 Hz (i.e., the orifices by closing down then contain the relatively incompressible fluid in the inner chamber). On the other hand, at vehicle rest the exhaust system is contained by the very low durometer of the elastomeric body 16.

Figure 5:
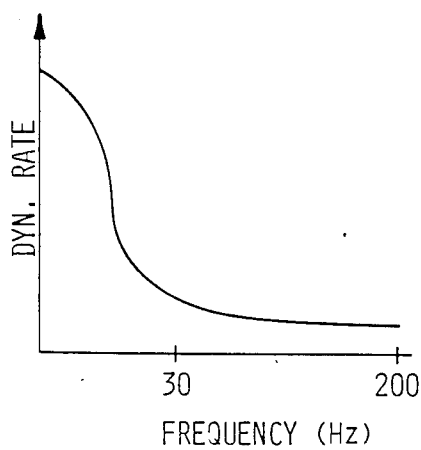
FIGS. 5-10 are graphs depicting the operating characteristics of the hydraulic mount in FIGS. 1-4.
Figure 6:
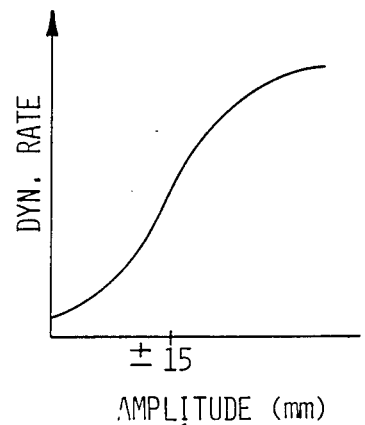
Figure 7:
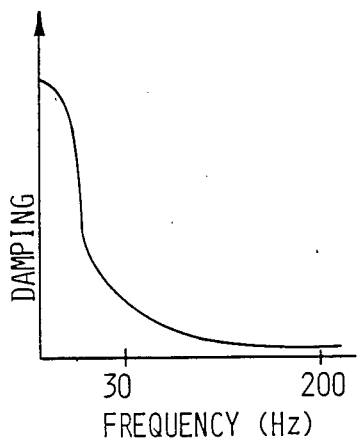
Figure 8:
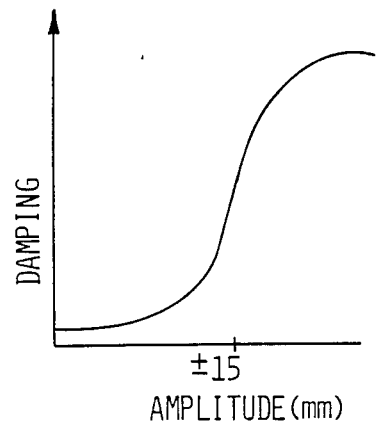
Figure 9:
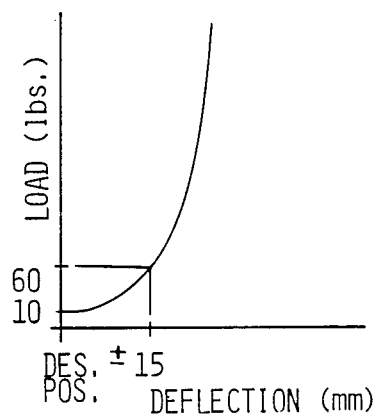
Figure 10:
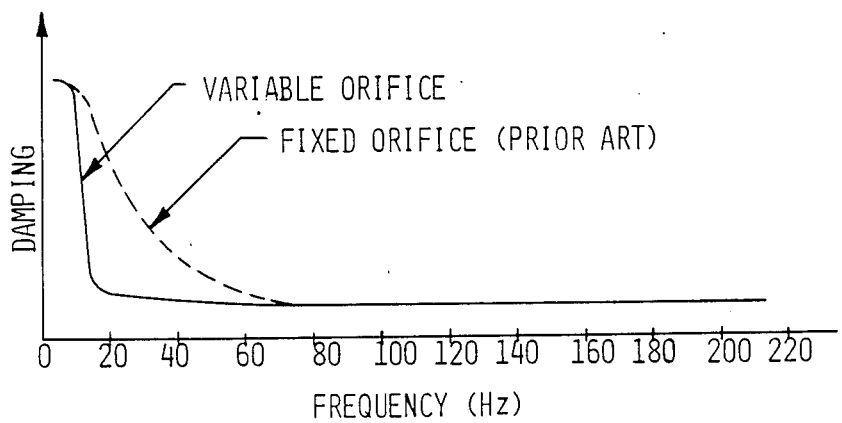

The operating characteristics of the hydraulic mount with the variable damping provided for the exhaust system described above are depicted in FIGS. 5–10. In FIGS. 5 and 7, it is seen that the dynamic rate and damping reduces dramatically just below 30 Hz and then is relatively constant out to 200 Hz. On the other hand, as seen in FIGS. 6 and 8, the dynamic rate and damping increases dramatically up to and past ±15 mm amplitude. And then in FIG. 9, it is seen that in the exhaust system's design position with a 10 pound load, the rate in the mount increases gradually with deflection up to a maximum anticipated load of 60 pounds so as to maintain the system within ±15 mm of its designed position. Then finally in FIG. 10, the variable orifice hydraulic mount of the present invention (solid line) is compared with a conventional fixed orifice hydraulic mount (dashed line) and it is seen that the damping in the device according to the present invention falls off dramatically from a high to a low level just below the prescribed low frequency (large amplitude) and thereafter remains constant whereas with the fixed orifice, the damping falls off gradually which is undesirable for best vibration isolation of an exhaust system or engine in a motor vehicle.

It will be appreciated that while two pairs of similar valves are used in the preferred embodiment, similar results may be obtained with only two such valves oppositely arranged or more valves may be used depending on the volume flow requirements. It will also be appreciated that while the preferred embodiment has been shown as being especially adapted to mounting an exhaust system in a motor vehicle, the hydraulic mount of the present invention is also adaptable to mounting other devices such as an internal combustion engine in a motor vehicle where similar operating characteristics are desired.

The above described preferred embodiment is thus illustrative of the invention which may be modified within the scope of the appended claims.

The embodiments of the invention in which an exclusive property or privilege is claimed are defined as follows:

1. A hydraulic mount comprising a shell, a pair of mounting members extending into the interior of said shell from opposite directions, elastomeric means joining said mounting members to the interior of said shell and defining a first chamber that expands and contracts with relative reciprocal movement of said mounting members, expansible means within said first chamber defining a second chamber that expands and contracts with relative reciprocal movement of said mounting members in unison with and at a faster rate than said first chamber, liquid filling said chambers, first variable size orifice means for connecting said first chamber to said second chamber with an orifice that decreases in size with increasing pressure differential between said chambers above a prescribed pressure range when the pressure in said first chamber is greater, and second variable size orifice means for connecting said second chamber to said first chamber with an orifice that decreases in size with increasing pressure differential between said chambers above said prescribed pressure range when the pressure in said second chamber is greater.

2. A hydraulic mount comprising a shell, a pair of mounting members extending into the interior of said shell from opposite directions, elastomeric means joining said mounting members to the interior of said shell and defining a first chamber that expands and contracts with relative reciprocal movement of said mounting members, expansible means within said first chamber having opposing rigid walls connected to said mounting members respectively and defining a second chamber that expands and contracts with relative reciprocal movement of said mounting members in unison with and to a greater degree than said first chamber, liquid filling said chambers, first variable size orifice means for connecting said first chamber to said second chamber with an orifice that decreases in size with increasing pressure differential between said chambers above a prescribed pressure range when the pressure in said first chamber is greater, and second variable size orifice means for connecting said second chamber to said first chamber with an orifice that decreases in size with increasing pressure differential between said chambers above said prescribed pressure range when the pressure in said second chamber is greater.

3. A hydraulic mount comprising a shell, a pair of mounting members extending into the interior of said shell from opposite directions, elastomeric means joining said mounting members to the interior of said shell and defining a first chamber that expands and contracts with relative reciprocal movement of said mounting members, expansible means within said first chamber having two spaced sides fixed respectively to said mounting members and defining a second chamber that expands and contracts with relative reciprocal movement of said mounting members in unison with and to a substantially greater degree than said first chamber, liquid filling said chambers, at least one elastomeric valve mounted in one of said sides for connecting said first chamber to said second chamber with an orifice that decreases in size in response to increasing pressure differential between said chambers above a prescribed pressure range when the pressure in said first chamber is greater, and at least one elastomeric valve mounted in one of said sides for connecting said second chamber to said first chamber with an orifice that decreases in size in response to increasing pressure differential between said chambers above said prescribed pressure range when the pressure in said second chamber is greater.

4. A hydraulic mount as set forth in claim 3, and each said elastomeric valve having a funnel-like configuration that converges with a decreasing wall thickness.

* * * * *